United States Patent [19]

Mehus

[11] 4,372,345
[45] Feb. 8, 1983

[54] FAIL-SAFE VALVE

[75] Inventor: Richard J. Mehus, Minneapolis, Minn.

[73] Assignee: Economics Laboratory, Inc., St. Paul, Minn.

[21] Appl. No.: 282,924

[22] Filed: Jul. 13, 1981

[51] Int. Cl.³ .................. B08B 3/08; F16L 55/14
[52] U.S. Cl. .................. 137/636; 119/14.18; 134/166 C; 251/5; 251/6; 251/58; 251/9; 285/397
[58] Field of Search .......... 134/167 C, 168 C, 166 C, 134/169 C; 119/14.18; 251/4, 5, 6, 58, 9; 137/636, 636.1, 636.2; 285/239, 370, 397

[56] References Cited

U.S. PATENT DOCUMENTS

| | | | |
|---|---|---|---|
| 1,996,855 | 4/1935 | Cheswright | 285/239 |
| 2,183,835 | 12/1939 | Foulke | 251/58 |
| 2,659,387 | 11/1953 | Farris | 251/58 |
| 3,016,915 | 1/1962 | Moeller, Jr. | 137/636.1 |
| 3,269,754 | 8/1966 | Bertling et al. | 285/397 |
| 3,385,265 | 5/1968 | Schrader | 119/14.18 |
| 3,744,524 | 7/1973 | Blau | 251/6 |
| 3,754,768 | 8/1973 | Ellis et al. | 251/6 |
| 4,020,871 | 5/1977 | Groth et al. | 137/636.2 |

*Primary Examiner*—George L. Walton

*Attorney, Agent, or Firm*—Merchant, Gould, Smith, Edell, Welter & Schmidt

[57] ABSTRACT

A fail-safe valve (10) for precluding contamination of fluid, such as milk, having passed through a main fluid flow line (12) from an input end, such as a milking claw, to a collection and storage tank is the subject of this application. A flushing conduit (46) through which flushing water or a sanitizing agent flows intersects the main fluid flow line (12).

A pinching element (54) is provided with a first arm (56) for pinching closed the main line (12) at a resilient portion thereof down-flow from the intersection (48) of the conduit (46) with the main line (12). The element (54) also includes a second arm (58) which is angularly spaced from the first arm (56). The pinching element (54) is mounted for pivoting about an axis so that, when the element (54) is in its first position, the main line (12) will be pinched closed. With the element (54) in this first position, the flushing conduit (46) will not be occluded. When the element (54) is pivoted to its second position, the second arm (58) will pinch the conduit (46) closed preventing flow therethrough. With the element (54) in the second position, flow through the main fluid flow line (12) will be unobstructed.

8 Claims, 6 Drawing Figures

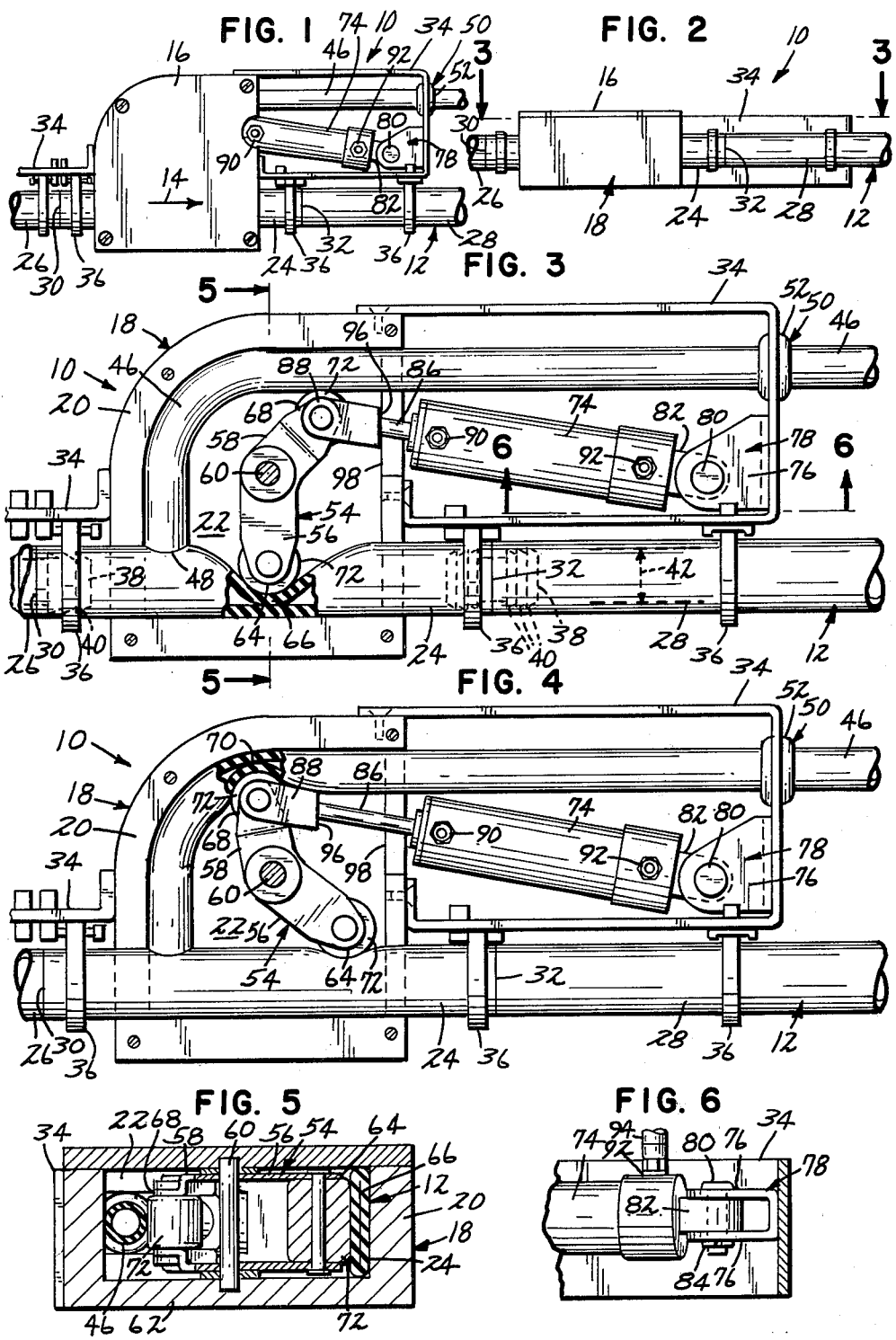

FAIL-SAFE VALVE

TECHNICAL FIELD

The invention of this application refers broadly to the field of valving. More narrowly, however, the invention is directed to a valve for preventing flow through a main fluid line toward a collecton container when a santizing or other flushing agent is introduced into the main line through a conduit intersecting the main line up-flow of the location at which fluid flow to the collection tank is occluded. The agent can, thereby, flow in an up-flow direction to flush the intake to the main fluid line without the fluid in the collection container becoming contaminated. In a preferred embodiment, the invention includes a valve which precludes contamination of milk, which has been transferred from a milking claw to a receiving tank, by a sanitizing agent when the agent is passed through a portion of the main line and through teat cups of the claw to flush the milking system.

BACKGROUND OF THE INVENTION

Numerous industrial applications exist for a system wherein, with an assembly used for conducting a fluid from one location to another through a main fluid flow line, a conduit is provided for introducing a flushing agent into a portion of the main fluid flow line and out through the intake end thereof. Illustrative of such a system—and a system with which the invention of the present application is particularly useful—is an automatic milking system typically used on dairy farms. Such a system includes a milking claw having a plurality of teat cups, each of which is attachable to one of the teats of a cow's udder. A vacuum source is provided to effectuate milking of the cow. As milk is received in each of the teat cups, it passes through a feed line and is deposited in a main milk line for transfer to a storage tank.

A condition known as mastitis has been found to be prevalent in dairy cow herds. The condition is caused by the streptococcus hemolyticus microorganism and is transmitted from one cow in the herd to another when the milking claw of an automatic milking machine is attached to the udder of a healthy cow after having been used on a cow infected with mastitis. Consequently, the condition spreads fairly easily among the herd.

One particular strain of mastitis, although affecting the cows in a cattle herd, has no affect on humans. Consequently, when cows are infected with this strain, their milk may yet meet standards for human consumption and can be passed to the receiving and storage container for pasteurization and other processing subsequent to its collection.

Another strain can, however, cause septic sore throat in humans if the milk from an infected cow is ingested. Even when a cow is infected with this particular strain, however, it is necessary to draw milk from the cow at regular intervals. To this end, the easiest way that the milk can be drawn from the infected cow is by milking it with the automatic system at the same intervals at which healthy cows are milked.

With either strain of the microorganism, therefore, it is necessary to flush the teat cups of the milking claw prior to transfering the claw from one cow to another. Various solutions and sanitizing agents can be used for this purpose. One typical sequence of flushings would include a first phase wherein water is passed through the outermost portion of the main milk line and through the teat cups, a second phase, wherein a sanitizing agent such as an iodine solution is flushed through the outer portion of the milk line and the teat cups, and a third phase wherein water is again used as the flushing solution. Numerous phases and sequences can be utilized.

Regardless of the type of agent and sequencing of flushing used, however, it is important that sanitizing agent introduced into the outer portion of the main milk line through a conduit intersecting that line be precluded from passing through the line in a direction other than towards a milking claw. The agent can, thereby, be prevented from contaminating the milk to be used for human consumption.

The invention of the present application is apparatus for accomplishing this function. It includes positive means, responsive to the opening of the sanitizing agent conduit, for closing off the main milk line to prevent flow of the agent to the milk storage tank.

SUMMARY OF THE INVENTION

The present invention is a fail-safe valve for precluding contamination of a fluid which has been transferred through a main fluid flow line to a storage tank, by a sanitizing or similar agent which is introduced into the main fluid flow line proximate one end thereof to flush the intake end of the line. It is specifically designed for use with a system wherein either or both of the main fluid line and the conduit by which the agent is introduced into the main fluid line have a resilient portion. Such a system is designed so that the conduit intersects the main fluid flow line at a location with respect to fluid flow through the main line, up-flow of the portion of the main line which is resilient. Typically, however, both the main fluid flow line and the agent transmitting conduit can be resilient along their lengths.

The valve apparatus includes first means for pinching the resilient portion of the main line—that is, a portion down-flow of the intersection of the conduit with the main line—closed to prevent flow in a down-flow direction. Second means, responsive to the first pinching means are provided to pinch the conduit, at its resilient portion, closed when the main fluid flow line is open. Conversely, because of the inverse operative relationship of the first and second pinching means, the agent delivery conduit is unobstructed allowing flow of the agent into the main fluid flow line only when the main flow line is pinched closed.

The two pinching means, together, can comprise a pinching element having first and second arms for effecting opening and closing of the main line and agent delivery conduit. The arms can be unitarily formed, being angularly spaced from one another, with the element mounted for rotation about an axis and between a first position wherein the main flow line is occluded and a second position wherein the agent delivery conduit is occluded. In order to economize on space and to effectuate complete closure of the desired tube, the angle between the two arms can be made to be approximately 50 degrees.

As the element is pivoted to its first position, an end of the first arm remote from the axis about which the element rotates is brought to bear against the resilient portion of the main fluid flow line, pinching the wall of the line closed to completely preclude flow therethrough. With the element in this position, flow through the agent delivery conduit is unobstructed, and, in applications such as flushing systems for automatic milking machines, the sanitizing agent can be allowed to flow through the teat cups of a milking claw to santize the cups. During normal milking operations, however, the pinching element can be selectively moved to its second position wherein flow of sanitizing agent is precluded through the flushing conduit. In this position, an end of the second arm remote from the axis of pivoting engages the flushing conduit and pinches it closed. Introduction of sanitizing agent into the main fluid flow line is, thereby, prevented. Milk drawn from the cow's udder will be allowed, therefore, to flow through the main line to a milk receiving and storage tank.

In a preferred embodiment, the remote end of each of the arms can be provided with generally ciruclarly cylindrical members which are mounted to said remote ends for rotation about axes generally parallel to the axis about which the pinching element pivots. Frictional wear to the tubes can, thereby, be reduced.

A housing can be provided with the intersection of the main flow line and the flushing conduit being positioned therein. The resilient portions of the line and the flushing conduit can be disposed against at least a portion of a peripheral wall of the housing so that, as the remote ends of the pinching arms are brought to bear against the tubes, the tubes will be held immobile to effect closure.

Means can be provided to pivot the pinching element as desired. The means can include a hydraulic cylinder having a rod attached, at one end, to the pinching element at a point off-set from its axis of pivoting, and, at its other end, to a piston slidably disposed within the cylinder. The piston can be made to move by introduction of a fluid on one or another side thereof, and, as movement is imparted to the piston, its movement will be transmitted, through the rod, to the pinching element, thereby causing its rotation about its axis.

When the system includes a housing, a resilient portion of tubing, which is to be inserted into a discontinuity in the main fluid flow line, can be permanently held within the housing. An entrance into the insert can be mated to an up-flow portion of the main flow line, and an exit from the insert can be mated with a down-flow portion of the main line. If the backflushing valving apparatus of this application is not desired to be used, therefore, the up-flow and down-flow portions of the main line can be mated directly eliminating the housing and, thereby, the intersection of the flushing conduit with the main fluid flow line.

The valving apparatus of this application is, thus, an invention designed to solve many of the problems existent in the prior art. More specific advantages of the invention will become apparent with reference to the DETAILED DESCRIPTION OF THE INVENTION and CLAIMS which form a part of this specification, and the appended drawing.

BRIEF DESCRIPTION OF THE DRAWING

FIG. 1 is a side elevational view of the invention in accordance with the present application;

FIG. 2 is a bottom plan view of the fail-safe valve of FIG. 1;

FIG. 3 is an enlarged view taken generally along the line 3—3 of FIG. 2 showing the pinching element in its first position, some portions of the fail-safe valve being shown broken away;

FIG. 4 is a view similar to that of FIG. 3 showing the pinching element in its second position, some portions of the fail-safe valve being shown broken away;

FIG. 5 is a view taken generally along the line 5—5 of FIG. 3; and

FIG. 6 is a view taken generally along the line 6—6 of FIG. 3.

DETAILED DESCRIPTION OF THE INVENTION

Referring now to the drawing wherein like reference numerals denote like elements throughout the several views, FIG. 1 illustrates a fail-safe valve, generally indicated by reference numeral 10, in accordance with the invention of the present application. The valve 10 is for use in a fluid transfer system wherein it is desireable, or even necessary, to flush the intake end of the system. Typical of such a system is one incorporating an automatic milking apparatus which includes a milking claw (not shown) at the intake end of the system, which claw is attached to means for inducing a vacuum in teat cups of the claw. Milk thereby drawn from the udder of a cow to which the teat cups are attached is transferred through a main milk line 12 to a collection and storage tank (not shown) at the output end of the main line 12. In FIG. 1, the input end of the milk line 12 would be to the left, and the output end of the line 12 would be to the right, with flow through the line in a direction as indicated by arrow 14.

Referring now to FIG. 3, the fail-safe valve 10 is shown with a cover 16 removed from the valve housing 18. The housing 18 includes a peripheral wall 20 defining an interior chamber 22. The main milk line 12 extends through the chamber 22 with a resilient portion thereof adjacent the peripheral wall 20 of the housing 18. It will be understood that the portion of the milk line 12 which extends through the housing 18 can comprise an insert 24 interposed in the main milk line 12 within a discontinuity provided therein. During normal operations of the automatic milking system when use of the fail-safe valve of the present application is not desired, up-flow and down-flow portions 26, 28 of the main line 12 can be mated directly together without the valve 10 being operatively connected as it is illustrated in FIGS. 1, 3, and 4.

When backflushing of the milking claw is desired in order to sanitize the teat cups, the up-flow and down-flow portions 26, 28 can be unmated and the valve 10 inserted therebetween. Insertion of the valve 10 would be such that an entrance 30 to the insert portion 24 would communicate with the up-flow portion 26 of the main line 12 and an exit 32 from the insert 24 would communicate with the down-flow portion 28 of the main line 12. The insert 24 carried by the housing 18, therefore, would typically be dimensioned similarly to the up-flow and down-flow portions 26, 28.

In order to maintain the up-flow portion 26 of the line 12, the insert 24, and the down-flow portion 28 of the line 12 in axially alignment, brackets 34 having hose clamps 36 extending therefrom can be provided. Flexible nylon strap fasteners having snap locking means have been found to be appropriate for holding the various componenets of the main milk line 12 in alignment.

Additionally, alignment can be further facilitated and sealing of the interfaces between the up-flow portion 26 of the line 12 and the entrance 30 of the insert 24, and between the exit 32 from the insert 24 and the down-flow portion 28 of the line 12, by use of sleeves 38, one of which is insertable into the tubing at each interface. Each sleeve 38 includes a plurality of annular barbs 40 formed at each end thereof. The barbs 40 are angled such that they extend inwardly toward the longitudinal center of the sleeve 38. The barbs 40 are sized so that their outer diameters closely approximate the diameter 42 of the bores 44 extending axially through the tubing. The diameters of the barbs 40 should be the same or slightly larger than the diameter 42 of the bore 44.

Because of the size of the diameter of the barbs 40 and the direction of the angling thereof, the sleeves 38 can serve a three-fold function. First, along with the hose clamps 36, they can aid in axially aligning the tubing components. Second, they can function to lock the components together and resist tubing separation. Third, they can serve a sealing function at the interfaces of the various tubing components, thereby precluding leakage of the milk passing through the main milk line 12 from the claw to the collection and storage tank.

A chemical agent is introduced into the main fluid flow line 12—in an automatic milking apparatus application, the main milk transfer line—through a conduit 46 extending from an agent reservoir (not shown) to a point 48 at which the conduit 46 intersects the main fluid flow line 12. In an embodiment wherein a housing 18 carrying an insert 24 interposed in the discontinuity in the main milk line 12 is provided, the conduit 46 extends, along a portion of its length, wihtin the housing 18 and adjacent a portion of the peripheral wall 20 thereof. As seen in FIG. 3, the conduit 46 intersects the main milk line 12 within the housing 18. The conduit 46 also includes a resilient portion which allows compression and pinching off of fluid flow therethrough. External to the housing 18, the conduit 46 is supported by a portion of support bracket 34 as at 50. To protect the tubing, a protective grommet 52 can be provided at the point 50 at which the conduit 46 passes through the support bracket 34.

Although the main milk line 12 and conduit 46 have been defined as having a resilient portion which can be pinched to close the tubing to fluid flow, it will be understood that the various tubings need not have only a discrete indentifiable portion which is resilient. The whole length of the tubing can be resilient in nature, and, in practice, the various tubings would be so provided. Silicon tubing of a medical grade has been found appropriate to serve as the main fluid flow line 12 and the flushing conduit 46.

A pinching element 54 is provided to pinch closed the tubes at their various resilient portions. The element 54 can be structured having a pair of angularly spaced arms 56, 58 and for pivoting about an axis. The angular separation between arms 56, 58 should be between 40 and 60 degrees and, optimally, at 50 degrees. As best seen in FIG. 5, the element 54 can be mounted for pivoting about a shaft 60 journaled between a lateral wall 62 of the housing and valve cover 16.

The first arm 56 is of a length with respect to the distance between the axis about which the element 54 pivots and the main line 12 so that a remote end 64 of the arm 56 can pinch the fluid line 12 completely closed when the element 54 is in a first position. This positioning of the pinching element 54 is best illustrated in FIG. 3 at 66.

A second arm 58 of the pinching element 54 is structured so that, with the first arm 56 in this position, it does not cause the flushing conduit 46 to be occluded. When the element 54 is, however, pivoted to a second position, as illustrated in FIG. 4, wherein the remote end 64 of the first arm 56 substantially withdraws from a disposition occluding the main fluid flow line 12, a remote end 68 of the second arm 58 pinches the flushing conduit 46 closed as seen at 70 in FIG. 4.

In order to prevent wear to the tubings in the locations therealong where they are engaged by the remote ends 64, 68 of the arms 56, 58, each of the remote ends 64, 68 can be provided with a generally circularly cylindrical roller 72 which is mounted for rotation about an axis extending substantially parallel to the axis about which the pinching element 54 pivots. Rolling friction, rather than sliding friction will, thereby, be generated at the locations of tubing engagement, and tubing life will consequently, be increased.

Means can be provided for selectively pivoting the pinching element 54 between its first and second positions, as desired. As illustrated in the figures, a hydraulic cylinder 74 can be used for this purpose. Such a cylinder 74 is pivotally mounted at one end between legs 76 of a channel bracket 78 secured to the bracket 34 which supports the hose clamps 36 on the down-flow side of the housing 18. A pin 80 can be inserted through apertures in the legs 76 of the channel bracket 78 and a fitting 82 mounted at the end of the cylinder 74. The pin 80 can be retained within the aligned apertures by means of a nut or lock washer 84.

The cylinder 74 is of a type known in the art and includes a piston (not shown) disposed for sliding axially movement within the cylinder chamber. An actuation rod 86 extends from one face of the piston and out through the cylinder 74 opposite the end by which is pivotally mounted. The rod 86 is attached, pivotally, at its end 88 remote from the end by which it is mounted to the piston, to the pinching element 54. This point of attachment is at a location spaced from the axis about which the pinching element 54 rotates.

The cylinder 74 is provided with fluid ports 90, 92 for introducing a fluid on one side or the other of the piston to induce axial movement of the piston as desired to accomplish an intended direction of pivoting of the pinching element 54. Fittings 90, 92 can be provided on the wall of the cylinder 74 to allow attachment of hoses 94 which communicate with a fluid reservoir. Pumping of the fluid to the cylinder 74 can be accomplished in any manner known in the art.

The application of the invention wherein the valve 10 is used in flushing the milking claw of an automatic milking system will be used to illustrate operation of the valve 10. With the valve 10 assembled so that the insert 24 is securely interposed in the discontinuity in the main milk line 12 and the teat cups are attached to teats of a cow to be milked, the pinching element 54 would be in its second position as illustrated in FIG. 4. With the element 54 in this position, milk drawn from the cow can freely pass through the up-flow portion 26 of the main line 12, the insert 24, and the down-flow portion 28 of the main line 12 in transiting from the milking claw to the collection and storage container. The flushing conduit 46, through which a sanitizing agent or flushing water can be introduced, is, concurrently, closed so that neither flushing water nor sanitizing agent can enter the milk passing to the collection container and contaminate the milk.

When the milking claw is removed from the udder of the cow being milked, the hydraulic piston can be actuated and fluid introduced through the fluid port 90 on the left of the cylinder 74 as seen in FIGS. 1, 3, and 4.

Allowing fluid to enter the cylinder 74 through this port 90 will cause the piston disposed within the cylinder 74 to be urged to the right. Fluid in the right chamber of the cylinder 74 will be driven out through the right port 92 and will return to the reservoir. Causing fluid flow through the cylinder 74 in the manner will effectuate a withdrawal of the actuation rod 86 into the cylinder 74 (in a rightward direction). The pinching element 54 will, thereby, be caused to rotate in a clockwise direction to its first position. In this position, the main milk flow line 12 will be closed at a point down-flow of the location 48 at which the flushing conduit 46 intersects the main line 12.

Actuation rod 86 extends through a discontinuity in peripheral wall 20. Because the cylinder 74 is typically too large to extend through the dicontinuity, rod 86 might, conceivably, cause withdrawal of the rod 86 into the cylinder 74 sufficiently far so that pinching element 54 might be pivoted beyond its first position. If this occurred, complete occlusion of the milk line 12 might not be maintained.

In order to preclude pivoting of element 54 beyond its first position, remote end 88 of actuation rod 86 can be provided with a stop. The stop can have a surface 96 for engaging, when the pinching element is in its first position, an inner surface 98 of peripheral wall 20. As actuation rod 86 retracts, therefore, movement thereof beyond a position in which these surfaces 96, 98 engage, and commensurately, pivoting of element 54 beyond its first position, will be precluded.

The clockwise rotation of the pinching element 54 will also effect withdrawal of the remote end 68 of the second arm 58 from the flushing conduit 46. Flow through the conduit 46 will, therefore, become unobstructed. Sanitizing agent or flushing water can then be pumped through the flushing conduit 46 without fear of it passing through the main milk line 12 to the collection and storage tank and, consequently, contaminating the milk. The pressure of the agent or flushing water will cause it to be driven out through the cups of the milking claw.

In order to preclude any residual sanitizing agent from being carried into the milk collection tank after the pinching element 54 is again pivoted to its second position, it is desireable to have a final sequence of flushing wherein water is passed through the flushing conduit 46 and teat cups prior to rotating the pinching element 54 to its second position for attachment of the claw to another cow.

Numerous characteristics and advantages of the invention have been set forth in the foregoing description. It will be understood that this disclosure is, in many respects, only illustrative. Changes may be made in details, particularly in matters of shape, size, and arrangement of parts without exceeding the scope of the invention. The invention's scope is defined by the language in which the appended claims are expressed.

What is claimed is:

1. Valving apparatus for selectively sanitizing the teat cups of one of a plurality of milking claws in an automatic milking system each claw havng a main milk line through which milk is conducted from the claw to a collection and storage container, comprising:
   (a) a housing having a peripheral wall;
   (b) a resilient main line insert carried by said housing and extending therethrough, said insert being adjacent at least a portion of said peripheral wall, said insert being insertable in a discontinuity in each main milk line to have an entrance communicating with an up-flow portion of the main line and an exit communicating with a down-flow portion of the main line;
   (c) a flushing conduit extending between a source of sanitizing agent and the main milk line for use in backflushing the milking claws, said conduit intersecting said insert within said housing and having a resilient portion within said housing and adjacent at least a portion of said peripheral wall; and
   (d) a pinching element, having angularly spaced first and second arms with remote ends, mounted within said housing for pivoting about a first axis between first and second positions, wherein said remote end of said first arm, when said element is in said first position, pinches closed said insert between said remote end and said portion of said peripheral wall to which said insert is adjacent, at a location along said insert down-flow of the intersection of said conduit with said insert, and wherein said remote end of said second arm, when said element is in said second position, pinches closed said flushing conduit between said remote end and said portion of said peripheral wall to which said conduit is adjacent.

2. Apparatus in accordance with claim 1 wherein said first and second arms have generally circularly cylindrical roller elements mounted at said remote ends thereof, and wherein said roller elements are disposed for rotation about secondary axes substantially parallel to said first axis.

3. Apparatus in accordance with claim 1 further comprising means for securely mating said entrance of said insert to the up-flow portion of the main milk line and said exit of said insert to the down-flow portion of the main line.

4. Apparatus in accordance with claim 3 wherein said mating means comprises a pair of sleeves, one for mating said entrance of said insert to the up-flow portion of the main milk line and one for mating said exit of said insert to the down-flow portion of the main line, each of said sleeves having a plurality of annular barbs formed externally at each end thereof, and each barb extending toward a longitudinal center of said sleeve and having a diameter closely approximating the inner diameters of the up-flow and down-flow portions of the main milk line and the inner diameter of said insert.

5. Apparatus in accordance with claim 1 wherein said main milk line insert and said flushing conduit are made of a medical grade silicon tubing.

6. Apparatus in accordance with claim 1 further comprising means for selectively pivoting said element about said first axis.

7. Apparatus in accordance with claim 6 wherein said pivoting means comprises a hydraulic cylinder having an actuation rod disposed for movement longitudinally thereof, and wherein said rod has an end remote from said cylinder pivotally attached to said pinching element at a location spaced from said first axis.

8. Apparatus in accordance with claim 7 wherein said remote end of said rod defines a stop for engaging a portion of said peripheral wall of said housing as said pinching element is pivoted about said first axis to preclude pivoting of said element beyond said first position.

* * * * *